US007525918B2

United States Patent
LeBlanc et al.

(10) Patent No.: US 7,525,918 B2
(45) Date of Patent: Apr. 28, 2009

(54) USING RTCP STATISTICS FOR MEDIA SYSTEM CONTROL

(75) Inventors: Wilfrid LeBlanc, Vancouver (CA); Darwin Rambo, Coverdale (CA)

(73) Assignee: Broadcom Corporation, Irvine, CA (US)

( * ) Notice: Subject to any disclaimer, the term of this patent is extended or adjusted under 35 U.S.C. 154(b) by 1027 days.

(21) Appl. No.: 10/349,247

(22) Filed: Jan. 21, 2003

(65) Prior Publication Data

US 2004/0141528 A1    Jul. 22, 2004

(51) Int. Cl.
*H04L 12/26* (2006.01)
(52) U.S. Cl. ...................................... 370/238; 370/516
(58) Field of Classification Search ................. 370/578, 370/235, 238, 290, 516
See application file for complete search history.

(56) References Cited

U.S. PATENT DOCUMENTS

| | | | | |
|---|---|---|---|---|
| 5,838,787 | A * | 11/1998 | Ding et al. | 379/406.07 |
| 6,654,463 | B1 * | 11/2003 | Leonidov et al. | 379/406.08 |
| 6,678,250 | B1 * | 1/2004 | Grabelsky et al. | 370/241 |
| 6,958,977 | B1 * | 10/2005 | Mitrani et al. | 370/252 |
| 6,961,539 | B2 * | 11/2005 | Schweinhart et al. | 455/12.1 |
| 6,990,616 | B1 * | 1/2006 | Botton-Dascal et al. | 714/715 |
| 7,012,893 | B2 * | 3/2006 | Bahadiroglu | 370/231 |
| 7,136,772 | B2 * | 11/2006 | Duchi et al. | 702/118 |
| 2002/0075857 | A1 | 6/2002 | LeBlanc | |
| 2002/0114285 | A1 | 8/2002 | LeBlanc | |
| 2004/0064760 | A1 * | 4/2004 | Hicks et al. | 714/43 |

FOREIGN PATENT DOCUMENTS

| | | |
|---|---|---|
| EP | 0 986 190 | 3/2000 |
| EP | 986190 A2 * | 3/2000 |
| EP | 1 024 638 | 8/2000 |
| WO | WO 01/45291 | 6/2001 |
| WO | WO 03/052959 | 6/2003 |

OTHER PUBLICATIONS

Kevin Jeffay, Best-Effort Multimedia Networking—Dealing with Delay-Jitter, lecture material for course COMP 249: Advanced Distributed System, Department of Computer Science, University of North Carolina at Chapel Hill, Nov. 11, 1999.*

Kevin Jeffay, Best-Effort Multimedia Networking Deailing with Delay-Jitter, as course material for COMP249 "Advanced Distributed Systems, Multimedia Networking", Department of Computer Science, University of North Carolina at Chapel Hill, Nov. 11, 1999.*

(Continued)

*Primary Examiner*—Kwang B Yao
*Assistant Examiner*—Andrew Lai
(74) *Attorney, Agent, or Firm*—McAndrews, Held & Malloy

(57) ABSTRACT

Methods for using communication network statistics in the operation of a real-time communication system are disclosed. Embodiments of the invention may provide improved playback of real-time media streams by incorporating into the algorithms used for playback of the media stream network statistics typically calculated by some transport protocols.

An additional aspect of the present invention may include machine-readable storage having stored thereon a computer program having a plurality of code sections executable by a machine for causing the machine to perform the foregoing.

45 Claims, 9 Drawing Sheets

OTHER PUBLICATIONS

Google search record for above NPL as of Aug. 31, 2007 showing entry for above NPL: [PDF] 10. Dealing w/ Delay-Jitter.*

Google search record for Kevin Jeffay as of Aug. 31, 2007 showing listing of courses, including above cited course, taught by Jeffay "COMP 249—Multimedia Networking (Fall 1999)".*

Kevin Jeffay, Best-Effort Multimedia Networking Dealing with Delay-Jitter, as course material for COMP249 "Advanced Distributed System, Multimedia Networking", Department of Computer Science, University of North Carolina at Chapel Hill, Nov. 11, 1999.*

* cited by examiner

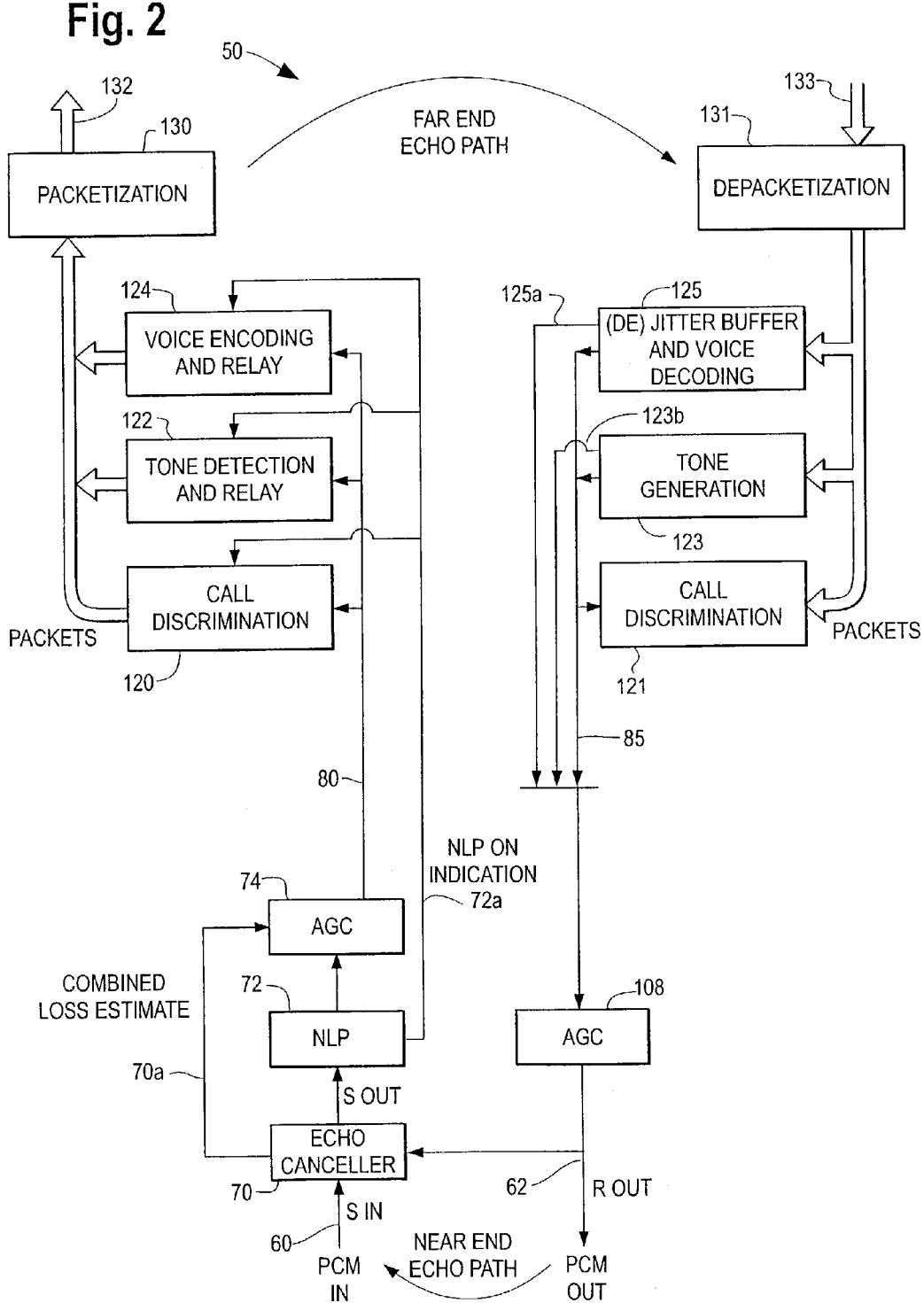

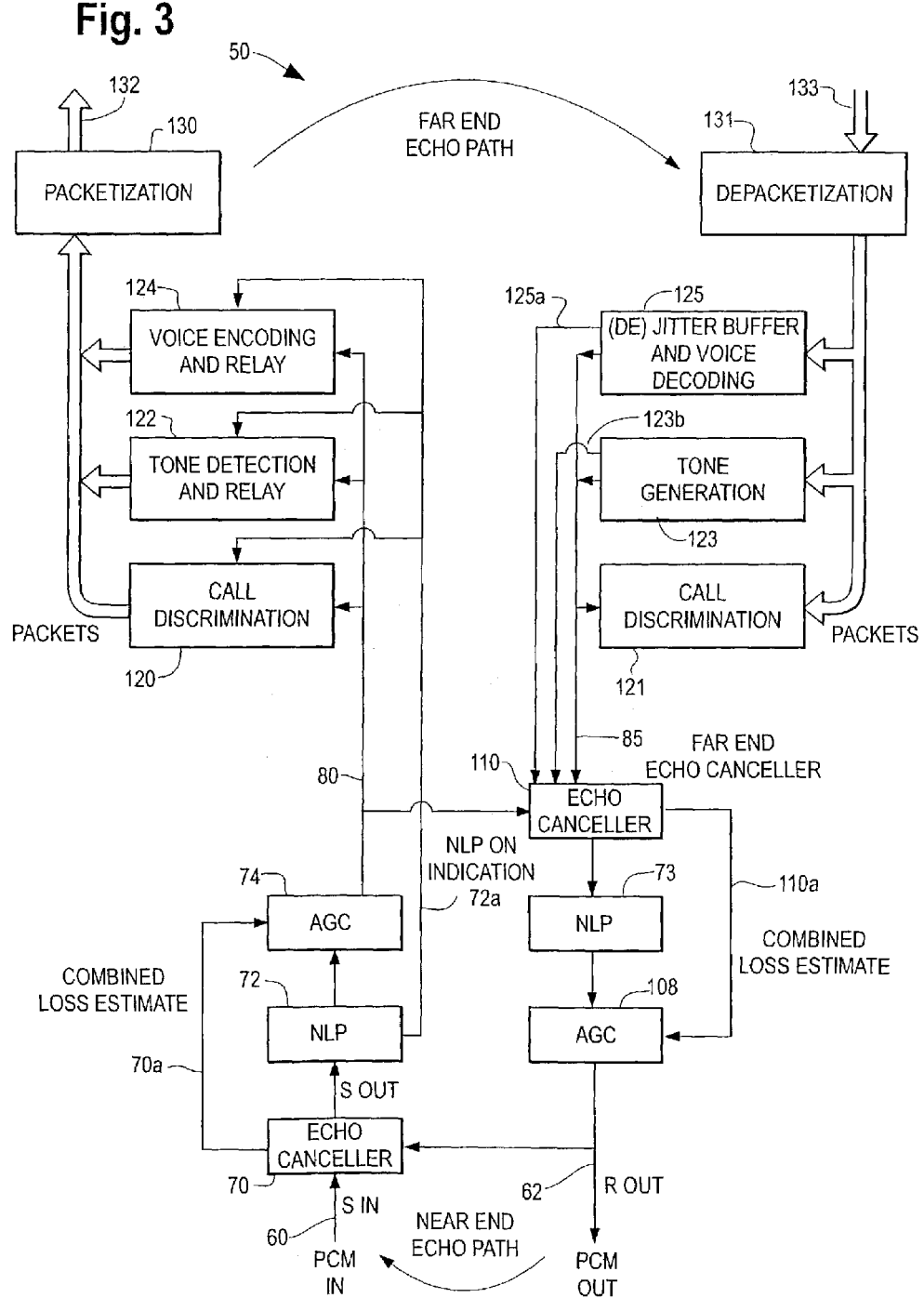

USING RTCP STATISTICS FOR MEDIA SYSTEM CONTROL

CROSS-REFERENCE TO RELATED APPLICATIONS/INCORPORATION BY REFERENCE

This application is also related to the following co-pending applications, each of which is herein incorporated by reference in its entirety:

| Ser. No. | Docket No. | Title | Filed | Inventors |
|---|---|---|---|---|
| 10/327,781 | 13715US01 | Packet Voice System with Far-End Echo Cancellation | Dec. 23, 2002 | LeBlanc |
| 10/327,747 | 13767US01 | Selectively Adaptable Far-End Echo Cancellation in a Packet Voice System | Dec. 23, 2002 | LeBlanc |
| 10/327,773 | 13768US01 | System and Method for Operating a Packet Voice Far-End Echo Cancellation System | Dec. 23, 2002 | LeBlanc |

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Telephony devices, such as telephones, analog fax machines, and data modems, have traditionally utilized circuit-switched networks to communicate. With the current state of technology, it is desirable for telephony devices to communicate over the Internet, or other packet-based networks. Heretofore, realization of an integrated system for interfacing various telephony devices over packet-based networks has been difficult due to the different modulation schemes of the telephony devices.

Network traffic for voice-over-Internet-protocol (VoIP) service consists of a stream of speech data packets, each providing a limited amount of speech playback time. In order to provide continuous speech, playback packets must arrive at regular intervals. The time that a packet takes to traverse the network varies, however, and is a function of a number of factors including, but not limited to, the number of nodes, the speed of the communications links, and the queuing delay that occurred at each node in the path. Variations in network delay, normally referred to as 'delay jitter,' occur as a part of normal packet network operation. Estimating network delay jitter is a challenging problem, since delay jitter can change quickly, and the delay jitter estimators typically adapt more slowly.

VoIP equipment compensates for variations in the network delay by queuing sufficient speech packets in a "jitter buffer." The proper sizing of the jitter buffer and management of speech playback depends upon having an accurate estimate of network delay jitter. Existing VoIP equipment depends upon internally generated estimates of network delay jitter, and operates without the benefit of external feedback. Internally-generated network delay jitter estimates may cause the algorithms that manage the jitter buffer to underestimate or overestimate the amount of speech data that is required, resulting in repeated or dropped speech frames. The repeating or dropping of speech frames typically generates audio impairments that become increasingly evident and unacceptable as the number of repeated and dropped frames rises.

An additional problem with existing VoIP operation relates to echo cancellation and suppression. There are several sources of echo that degrade the quality of an Internet protocol (IP) telephony connection, including the electronic hybrid circuit that converts the four-wire path used within the transmission network to the two-wire path used in the public switched telephone network loop, and the acoustic echo caused by the coupling of audio from the receiver to the transmitter of the voice terminal. The impact of these echo sources on call quality is primarily a function of the round-trip delay of the path between the parties of interest. If the round-trip delay is short, echo is indistinguishable from sidetone. In systems with far-end echo cancellers, the echo cancellers and suppressors are typically initialized with a predetermined bulk or round-trip delay value, and the round-trip delay estimate is then allowed to converge to the actual network round-trip delay during operation. During the convergence period, or when network round-trip delay changes, the echo canceller and suppressor perform sub-optimally, resulting in echo that is audible to the call participants.

Further limitations and disadvantages of conventional and traditional approaches will become apparent to one of skill in the art, through comparison of such systems with aspects of the present invention as set forth in the remainder of the present application with reference to the drawings.

BRIEF SUMMARY OF THE INVENTION

The present invention relates to systems which provide packet-based real-time communications service. More specifically, the invention described pertains to the use of statistical measurements that are typically available during the operation of the underlying real-time transport protocol to improve the quality of playback of the media stream.

Aspects of the present invention may be seen in a method for using communication network statistics in the operation of a real-time communication terminal, the method comprising exchanging at least one real-time media stream between a first communication terminal and a second communication terminal using a real-time communication protocol, calculating at the first communication terminal at least one network statistic, the at least one network statistic being a measure of the communication network performance, and modifying the operation of at least one algorithm used for the playback of the at least one real-time media stream at the first communication terminal or the second communication terminal, using the at least one network statistic. The at least one real-time media stream may comprise packetized speech and it may comprise packetized video.

In an embodiment in accordance with the present invention, the at least one network statistic may comprise an estimate of network delay jitter, the round trip delay between the first terminal and the second terminal, and the fraction of lost packets, while the at least one algorithm may comprise an algorithm to compensate for network delay jitter, to cancel or suppress echo, and to compensate for lost packet data. In the algorithm to cancel or suppress echo, the at least one network statistic may comprise an estimate of round trip delay between the first terminal and the second terminal, and the algorithm to cancel or suppress echo may be less aggressive when the round trip delay is relatively lower and more aggressive when the round trip delay is relatively higher. The real-time communication protocol in an embodiment of the present invention may be one of the real time protocols described in the Internet Engineering Task Force Request for Comments 1889.

Another embodiment in accordance with the present invention may be a method of operating an echo canceller or echo suppressor wherein the operation of the echo canceller or echo suppressor is adjusted based upon an estimate of round trip delay.

A further embodiment of the present invention may include machine-readable storage, having stored thereon a computer program having a plurality of code sections executable by a machine for causing the machine to perform the foregoing.

These and other advantages, aspects, and novel features of the present invention, as well as details of illustrated embodiments, thereof, will be more fully understood from the following description and drawings.

BRIEF DESCRIPTION OF SEVERAL VIEWS OF THE DRAWINGS

FIG. 2 is a functional block diagram illustrating the services invoked by a packet voice transceiver system according to an illustrative embodiment of the present invention.

FIG. 3 is a functional block diagram illustrating the services invoked by a packet voice transceiver system according to another illustrative embodiment of the present invention.

DETAILED DESCRIPTION OF THE INVENTION

In an illustrative embodiment of the present invention, a signal processing system is employed to interface voice telephony devices with packet-based networks. Voice telephony devices include, by way of example, analog and digital phones, Ethernet phones, IP phones, interactive voice response systems, private branch exchanges (PBXs) and any other conventional voice telephony devices known in the art. The described preferred embodiment of the signal processing system can be implemented with a variety of technologies including, by way of example, embedded communications software that enables transmission of voice data over packet-based networks. The embedded communications software is preferably run on programmable digital signal processors (DSPs) and is used in gateways, remote access servers, PBXs, and other packet-based network appliances.

Figure 1:
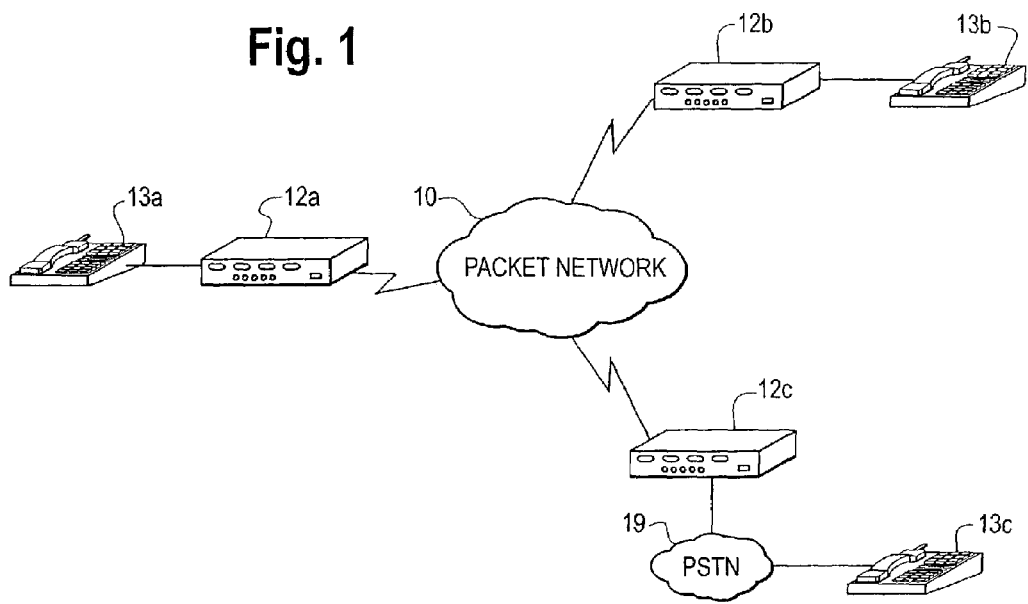
FIG. 1 is a functional block diagram representing a communication system in which the present invention may operate.

FIG. 1 is a functional block diagram representing a communication system that enables the transmission of voice data over a packet-based system such as voice-over-IP (VoIP, H.323), Voice over Frame Relay (VoFR, FRF-11), Voice Telephony over ATM (VTOA), or any other proprietary network, according to an illustrative embodiment of the present invention. In one embodiment of the present invention, voice data can also be carried over traditional media such as time division multiplex (TDM) networks and voice storage and playback systems. Packet-based network 10 provides a communication medium between telephony devices. Network gateways 12a and 12b support the exchange of voice between packet-based network 10 and telephony devices 13a and 13b. Network gateways 12a and 12b include a signal processing system which provides an interface between the packet-based network 10 and telephony devices 13a and 13b. Network gateway 12c supports the exchange of voice between packet-based network 10 and a traditional circuit-switched network 19, which transmits voice data between packet-based network 10 and telephony device 13c. In the described exemplary embodiment, each network gateway 12a, 12b, 12c supports a telephony device 13a, 13b, 13c.

Each network gateway 12a, 12b, 12c could support a variety of different telephony arrangements. By way of example, each network gateway might support any number of telephony devices, circuit-switched networks and/or packet-based networks including, among others, analog telephones, Ethernet phones, fax machines, data modems, PSTN lines (Public Switched Telephone Network), ISDN lines (Integrated Services Digital Network), T1 systems, PBXs, key systems, or any other conventional telephony device and/or circuit-switched/packet-based network. In the described exemplary embodiment, two of the network gateways 12a, 12b provide a direct interface between their respective telephony devices and the packet-based network 10. The other network gateway 12c is connected to its respective telephony device through a circuit-switched network such as a PSTN 19. The network gateways 12a, 12b, 12c permit voice, fax and modem data to be carried over packet-based networks such as PCs running through a USB (Universal Serial Bus) or an asynchronous serial interface, Local Area Networks (LAN) such as Ethernet, Wide Area Networks (WAN) such as Internet Protocol (IP), Frame Relay (FR), Asynchronous Transfer Mode (ATM), Public Digital Cellular Network such as TDMA (IS-13x), CDMA (IS-9x), or GSM for terrestrial wireless applications, or any other packet-based system.

Figure 1A:
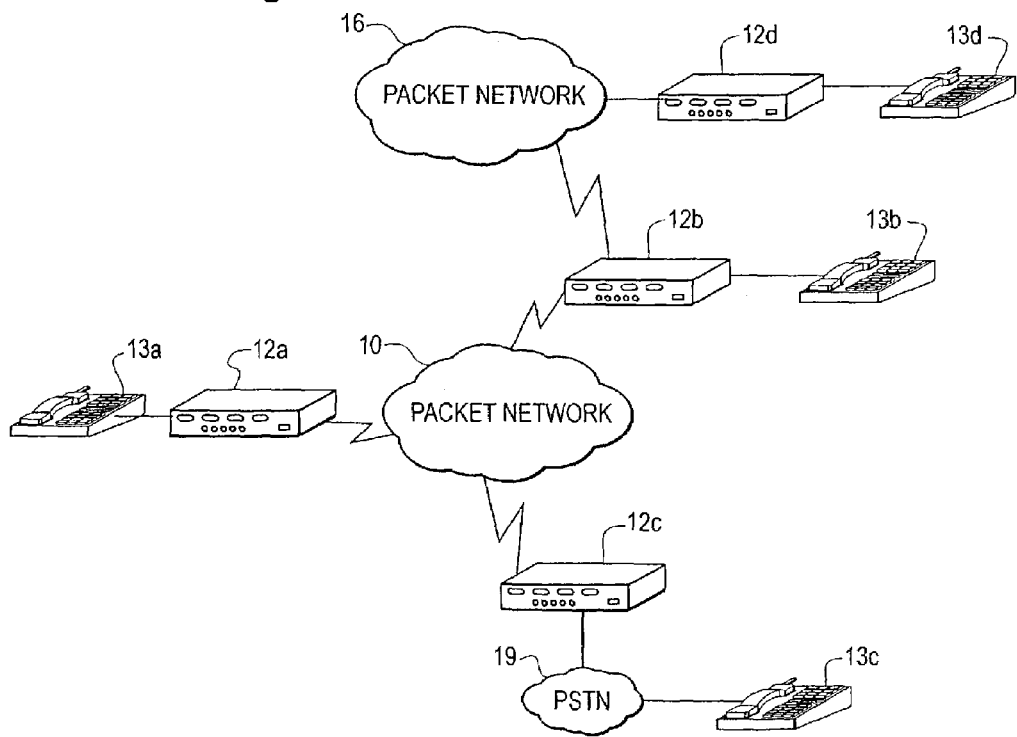
FIG. 1A is a functional block diagram representing a communication system in which the present invention may operate.

Another exemplary topology is shown in FIG. 1A. The topology of FIG. 1A is similar to that of FIG. 1 but includes a second packet-based network 16 that is connected to packet-based network 10 and to telephony device 13b via network gateway 12b. The signal processing system of network gateway 12b provides an interface between packet-based network 10 and packet-based network 16 in addition to an interface between packet-based networks 10, 16 and telephony device 13b. Network gateway 12d includes a signal processing system which provides an interface between packet-based network 16 and telephony device 13d.

FIG. 2 is a block diagram illustrating the services invoked by a packet voice transceiver system 50 according to an illustrative embodiment of the present invention. In an illustrative embodiment of the present invention, the packet voice transceiver system 50 resides in a network gateway such as network gateways 12a, 12b, 12c, 12d of FIGS. 1 and 1A. In an exemplary embodiment, Packet voice transceiver system 50 provides two-way communication with a telephone or a circuit-switched network, such as a PSTN line (e.g. DS0). The transceiver 50 receives digital voice samples 60, such as a 64 kb/s pulse code modulated (PCM) signal, from a telephone or circuit-switched network.

The incoming PCM signal 60 is initially processed by a near-end echo canceller 70 to remove near-end echoes that might otherwise be transmitted back to the far-end user. As the name implies, echoes in telephone systems are the return of the talker's voice resulting from the operation of the hybrid with its two-four wire conversion, or the acoustic echo of speech signal from the receiver to the transmitter of a voice terminal. If there is low end-to-end delay, echo from the far end is equivalent to sidetone (echo from the near-end), and therefore, not a problem. Sidetone gives users feedback as to how loudly they are talking and indeed, without sidetone, users tend to talk too loudly. However, far end echo delays of more than about 10 to 30 milliseconds (ms) significantly degrade the voice quality and are a major annoyance to the user.

For the purposes of this patent application, the user from which the ingress PCM signal 60 is received will be referred to as the near-end user. Thus the outgoing (egress) PCM signal 62 is provided to the near-end user. The user that receives the ingress packet voice signal 132, and that transmits the egress packet voice signal 133, will be referred to as the far-end user. However, it is to be understood that the "near-end" user, that sends and receives PCM signals 60 and 62, respectively, may reside either at a local device (such as a telephone) or at a device located across a circuit switched network. In an alternate embodiment such as, for example, a device that bridges an ATM network and an IP network, PCM signals 60 and 62 may instead be packet streams to be carried by a packet-based network, without departing from the spirit of the present invention.

Near-end echo canceller 70 is used to remove echoes of far-end speech present on the incoming PCM signal 60 before routing the incoming PCM signal 60 back to the far-end user. The near-end echo canceller 70 samples an outgoing PCM signal 62 from the far-end user, filters it, and combines it with the incoming PCM signal 60. In an exemplary embodiment, the near-end echo canceller 70 is followed by a non-linear processor (NLP) 72 which may mute the digital voice samples when far-end speech is detected in the absence of near-end speech. The NLP 72 may also inject comfort noise, which, in the absence of near end speech, may be roughly at the same level as the true background noise or at a fixed level.

After echo cancellation, the power level of the digital voice samples is normalized by automatic gain control (AGC) 74 to ensure that the conversation is of an acceptable loudness. Alternatively, the AGC can be performed before the near-end echo cancellation 70. However, this approach would entail a more complex design because the gain would also have to be applied to the sampled outgoing PCM signal 62. In the described exemplary embodiment, the AGC 74 is designed to adapt slowly in normal operation, but to adapt more quickly if overflow or clipping is detected. In one embodiment, the AGC adaptation is held fixed if the NLP 72 is activated.

In the voice mode, the transceiver 50 invokes three services, namely call discrimination 120, packet voice exchange 124, and packet tone exchange 122. The call discriminator analyzes the digital voice samples to determine whether a 2100 Hz tone (as in the case when the telephony device is a fax or a modem), a 1100 Hz tone or V.21 modulated high-level data link control (HDLC) flags (as in the case when the telephony device is a fax) are present. If a 1100 Hz tone or V.21 modulated HDLC flags are detected, a calling fax machine is recognized. The voice mode services are then terminated and the packet fax exchange is invoked to process the call. If a 2100 Hz tone is detected, the voice mode services are terminated and the packet data exchange is invoked. In the absence of a 2100 Hz tone, a 1100 Hz tone, or HDLC flags, the digital voice samples are coupled to the encoder system 124 and tone detection 122. The encoder system illustratively includes a voice encoder, a voice activity detector (VAD) and a comfort noise estimator. Tone detection 122 illustratively comprises a dual tone multi-frequency (DTMF) detector and a call progress tone detector. The outputs of the call discriminator 120, tone detection 122 and voice encoder 124 are provided to a packetization engine 130 which packetizes the data and transmits the packets 132 over the packet voice network.

Typical telephone conversations have as much as sixty percent silence or inactive content. Therefore, high bandwidth gains can be realized if digital voice samples are suppressed during these periods. In an illustrative embodiment of the present invention, a voice activity detector (VAD), operating under the packet voice exchange 124, is used to accomplish this function. The VAD attempts to detect digital voice samples that do not contain active speech. During periods of inactive speech, a comfort noise estimator, also operating under the packet voice exchange 124, provides silence identifier (SID) packets to the packetization engine 130. The SID packets contain voice parameters that allow the reconstruction of the background noise at the far end.

From a system point of view, the VAD may be sensitive to the change in the NLP 72. For example, when the NLP 72 is activated, the VAD may immediately declare that voice is inactive. In that instance, the VAD may have problems tracking the true background noise level. If the NLP 72 generates comfort noise during periods of inactive speech, it may have a different spectral characteristic from the true background noise. The VAD may detect a change in noise character when the NLP 72 is activated (or deactivated) and declare the comfort noise as active speech. For these reasons, in an illustrative embodiment of the present invention, the VAD is disabled when the NLP 72 is activated, as indicated by a "NLP on" message 72a passed from the NLP 72 to the voice encoding system 124.

The voice encoder, operating under the packet voice exchange 124, can be a straight 16-bit PCM encoder or any voice encoder which supports one or more of the standards promulgated by ITU. The encoded digital voice samples are formatted into a voice packet (or packets) by the packetization engine 130. These voice packets are formatted according to an applications protocol and outputted to the host (not shown). The voice encoder is invoked only when digital voice samples with speech are detected by the VAD.

In the described exemplary embodiment, voice activity detection is applied after the AGC 74. This approach provides optimal flexibility because the VAD and the voice encoder are integrated into some speech compression schemes such as those promulgated in ITU Recommendations G.729 with Annex B VAD (March 1996)—Coding of Speech at 8 kbits/s Using Conjugate-Structure Algebraic-Code-Exited Linear Prediction (CS-ACELP), and G.723.1 with Annex A VAD (March 1996)—Dual Rate Coder for Multimedia Communications Transmitting at 5.3 and 6.3 kbit/s, the contents of which is hereby incorporated by reference as through set forth in full herein.

Operating under the packet tone exchange 122, a DTMF detector determines whether or not there is a DTMF signal present at the near end. The DTMF detector also provides a pre-detection flag which indicates whether or not it is likely that the digital voice sample might be a portion of a DTMF signal. If so, the pre-detection flag is relayed to the packetization engine 130 instructing it to begin holding voice packets. If the DTMF detector ultimately detects a DTMF signal, the voice packets are discarded, and the DTMF signal is coupled to the packetization engine 130. Otherwise the voice packets are ultimately released from the packetization engine 130 to the host (not shown). The benefit of this method is that there is only a temporary impact on voice packet delay when a DTMF signal is pre-detected in error, and not a constant buffering delay. In one embodiment, whether voice packets are held while the pre-detection flag is active is adaptively controlled by the user application layer.

A call progress tone detector also operates under the packet tone exchange 122 to determine whether a precise signaling tone is present at the near end. Call progress tones are tones that indicate what is happening to dialed phone calls. Conditions like busy line, ringing called party, bad number, and others each have distinctive tone frequencies and cadences assigned them. The call progress tone detector monitors the call progress state, and forwards a call progress tone signal to the packetization engine 130 to be packetized and transmitted across the packet-based network. The call progress tone detector may also provide information regarding the near-end hook status which is relevant to the signal processing tasks. If the hook status is "on-hook," the VAD should preferably mark all frames as inactive, DTMF detection should be disabled, and SID packets should only be transferred if they are required to keep the connection alive.

The decoding system of the packet voice transceiver system 50 essentially performs the inverse operation of the encoding system. The decoding system comprises a depacketizing engine 131, a call discriminator 121, tone generation functionality 123, and a voice decoding system 125.

The depacketizing engine 131 identifies the type of packets received from the host (i.e., voice packet, DTMF packet, call progress tone packet, SID packet) and transforms them into frames that are protocol-independent. The depacketizing engine 131 then provides the voice frames (or voice parameters in the case of SID packets) to the voice decoding system 125 and provides the DTMF frames and call progress tones to the tone generation functionality 123. In this manner, the remaining tasks are, by and large, protocol independent.

The voice decoding system 125 illustratively includes a jitter buffer that compensates for network impairments such as delay jitter caused by packets not arriving at the same time or in the same order in which they were transmitted. In addition, the jitter buffer compensates for lost packets that occur on occasion when the network is heavily congested. In one embodiment, the jitter buffer for voice includes a voice synchronizer that operates in conjunction with a voice queue to provide an isochronous stream of voice frames to the voice decoder.

In addition to a voice decoder and a jitter buffer, the voice decoding system 125 also illustratively includes a comfort noise generator and a lost packet recovery engine, a VAD and a comfort noise estimator. Sequence numbers embedded into the voice packets at the far end can be used to detect lost packets, packets arriving out of order, and short silence periods. The voice synchronizer analyzes the sequence numbers, enabling the comfort noise generator during short silence periods and performing voice frame repeats via the lost packet recovery engine when voice packets are lost. SID packets can also be used as an indicator of silent periods causing the voice synchronizer to enable the comfort noise generator. Otherwise, during far-end active speech, the voice synchronizer couples voice frames from the voice queue in an isochronous stream to the voice decoder. The voice decoder decodes the voice frames into digital voice samples suitable for transmission on a circuit switched network, such as a 64 kb/s PCM signal for a PSTN line. In the exemplary embodiment of FIG. 2, the output of the voice decoder is provided to AGC 108.

The comfort noise generator of the voice decoding system 125 provides background noise to the near-end user during silent periods. If the protocol supports SID packets, (and these are supported for VTOA, FRF-11, and VoIP), the comfort noise estimator at the far-end encoding system should transmit SID packets. Then, the background noise can be reconstructed by the near-end comfort noise generator from the voice parameters in the SID packets buffered in the voice queue. However, for some protocols, namely, FRF-11, the SID packets are optional, and other far-end users may not support SID packets at all. In these systems, the voice synchronizer must continue to operate properly. In the absence of SID packets, the voice parameters of the background noise at the far end can be determined by running the VAD at the voice decoder in series with a comfort noise estimator.

The tone generation functionality 123 illustratively includes a DTMF queue, a precision tone queue, a DTMF synchronizer, a precision tone synchronizer, a tone generator, and a precision tone generator. When DTMF packets arrive, they are depacketized by the depacketizing engine 131. DTMF frames at the output of the depacketizing engine 131 are written into the DTMF queue. The DTMF synchronizer couples the DTMF frames from the DTMF queue to the tone generator. Much like the voice synchronizer, the DTMF synchronizer provides an isochronous stream of DTMF frames to the tone generator. The tone generator of the tone generation system 123 converts the DTMF signals into a DTMF tone suitable for a standard digital or analog telephone, and provides the DTMF signal to AGC 108.

When call progress tone packets arrive, they are depacketized by the depacketizing engine 131. Call progress tone frames at the output of the depacketizing engine 131 are written into the call progress tone queue of the tone generation functionality 123. The call progress tone synchronizer couples the call progress tone frames from the call progress tone queue to a call progress tone generator. Much like the DTMF synchronizer, the call progress tone synchronizer provides an isochronous stream of call progress tone frames to the call progress tone generator. The call progress tone generator converts the call progress tone signals into a call progress tone suitable for a standard digital or analog telephone, and provides the DTMF signal to AGC 108.

FIG. 3 illustrates an alternative embodiment of the present invention similar to that in FIG. 2, but to which has been added far-end echo canceller 10 and non-linear processor (NLP) 73. In the exemplary embodiment, far-end echo canceller 110 is used to remove echoes of near-end speech present on the outgoing PCM signal 62 before providing the outgoing PCM signal 62 to the near-end user or circuit-switched network. The far-end echo canceller 110 samples an ingress PCM signal 80 from the near-end user, filters it, and combines it with the egress PCM signal 85. In the exemplary embodiment, the far-end echo canceller 110 is followed by a NLP 73 which may mute the digital voice samples when near-end speech is detected in the absence of far-end speech. The NLP 73 may also inject comfort noise, which, in the absence of near end speech, may be roughly at the same level as the true background noise or at a fixed level. In an alternative embodiment, the NLP 73 suppresses the samples by a fixed or variable gain. In yet another embodiment, the NLP combines these two schemes.

In the exemplary embodiment shown in FIG. 3, the NLP 73 provides the echo-cancelled PCM signal to automatic gain control (AGC) element 108. AGC 108 normalizes the power level of the digital voice samples to ensure that the conversation is of an acceptable loudness. Alternatively, the AGC can be performed before the far-end echo cancellation 110. In the described exemplary embodiment, the AGC 108 is designed to adapt slowly in normal operation, but to adapt more quickly if overflow or clipping is detected. In one embodiment, the AGC adaptation is held fixed if the NLP 73 is activated. The AGC 108 provides the normalized PCM signal to the PCM output line 62.

Figure 4:
FIG. 4 is a functional block diagram representing an illustrative communication, in accordance with an embodiment of the present invention.

In most packet telephony systems, the transceiver systems on both ends of a communication would have a "near-end" echo canceller, i.e., an echo canceller that cancels echo of the egress far-end signal that is present in the ingress near-end signal before transmitting the ingress near-end to the far end. FIG. 4 is a functional block diagram representing an illustrative communication, in accordance with an embodiment of the present invention. In FIG. 4, the voice from talker 1 (300) is processed by transceiver system 1 (310), which transmits a packetized signal over packet network 320 to transceiver system 2 (330), which processes the packet signal and provides an audio signal to talker 2 (340). Similarly, the voice from talker 2 (340) is processed by transceiver system 2 (330), which transmits a packetized signal over packet network 320 to transceiver system 1 (310), which processes the packet signal and provides an audio signal to talker 1 (300). The near-end echo canceller in system 1 (310) operates on behalf of talker 2 (340). In other words, if the echo canceller in system 1 (310) is disabled, then talker 2 (340) will perceive echo (assuming the round trip delay in the packet network 320 is larger than about 10-20 ms. or so). The near-end echo canceller in system 2 (330) operates on behalf of talker 1 (300). Thus, if the echo canceller in system 2 (330) is disabled, then talker 1 (300) will perceive echo. The near-end echo cancellers are referred to as such because they cancel echo generated on the near end. That is, the near-end echo canceller in system 1 removes echo generated between system 1 (310) and talker 1 (300), echo that the far-end (talker 2) would perceive.

In an illustrative embodiment, system 2 (330) does not have an echo canceller. Such an embodiment may be implemented, for example, where cost is an issue, where it is believed that the delay is low and an echo canceller is not necessary, and/or in cases where the echo canceller in system 2 (330) is ineffective. To cope with this situation, a transceiver system may be designed that cancels echo in both directions, such as the transceiver system illustrated in FIG. 3. Such a transceiver system may comprise, for example, the transceiver system described in patent application Ser. No. 10/327,773, "SYSTEM AND METHOD FOR OPERATING A PACKET VOICE FAR-END ECHO CANCELLATION SYSTEM," filed Dec. 23, 2002, which is incorporated herein by reference in its entirety. In the exemplary embodiment of FIG. 3, near-end echo canceller 70 cancels "near-end" echo for the benefit of the far-end user, while far-end echo canceller 110 cancels "far-end" echo for the benefit of the near-end user.

Figure 5:
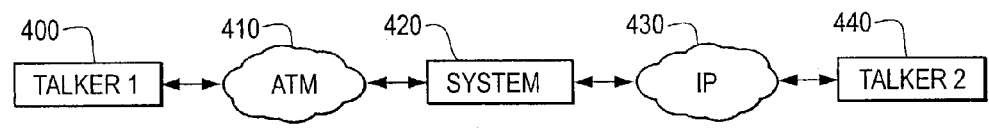
FIG. 5 is a functional block diagram representing another communication system in which the present invention could be employed.

Another embodiment in accordance with the present invention may be seen in a device which bridges two different networks (e.g., a bridge between ATM and IP networks.) FIG. 5 is a functional block diagram representing another communication system in which the present invention could be employed. In the communication shown in FIG. 5, talker 1 (400) accesses a packet voice network 410 via a device that does not have echo control. In the embodiment shown, talker 2 (440) accesses a VoIP system 430 via a device without echo control.

In an illustrative embodiment of the present invention, the transceiver system 420 that transcodes between voice over IP and voice over ATM has two echo cancellers. However, it may not be very meaningful to call one "near end" and one "far end." Both are operating over a packet voice network, and the concept of "near" and "far," in this instance, is ambiguous. For purposes of explanation in the present application, the two echo cancellers in such a transceiver are sometimes referred to as a near-end echo canceller and a far-end echo canceller. However, it is to be understood that in certain implementations of the present invention, the terms "near end" and "far-end" hold little, if any literal meaning.

Referring once again to the exemplary embodiment of FIG. 2, packet voice transceiver system 50 may compensate for variations in network transit delay by employing voice decoding system 125, which contains a jitter buffer to queue speech data. A jitter buffer such as that contained within voice decoding system 125 of the exemplary embodiment may be necessary because the transit delay of the packet network serving voice transceiver system 50 varies from packet to packet, and each packet of egress packet voice signal 133 contains speech data representing a limited period of speech playback. The amount of speech data to be queued within the jitter buffer is a function of the variation in network transit delay, or "delay jitter," of the path carrying egress packet voice signal 133. When network transit delay decreases, speech data may be received more quickly than it is consumed by playback, causing space in the jitter buffer to be exceeded. In this case the jitter buffer "overflows" and speech data is discarded. When network transit delay increases, speech data may be consumed by playback more quickly than it is received, causing the speech data in the jitter buffer to be exhausted. In this case, the jitter buffer "underflows" and previously played speech data may need to be repeated to fill the void. Both overflow and underflow result in undesirable audible impairments. To minimize the frequency of overflow and underflow, voice decoding system 125 may, for example, maintain an estimate of delay jitter for egress packet voice signal 133, tracking the minimum and maximum observed delay jitter and attempting to manage the jitter buffer so as to control the frequency of occurrence of overflow and underflow.

Figure 6:
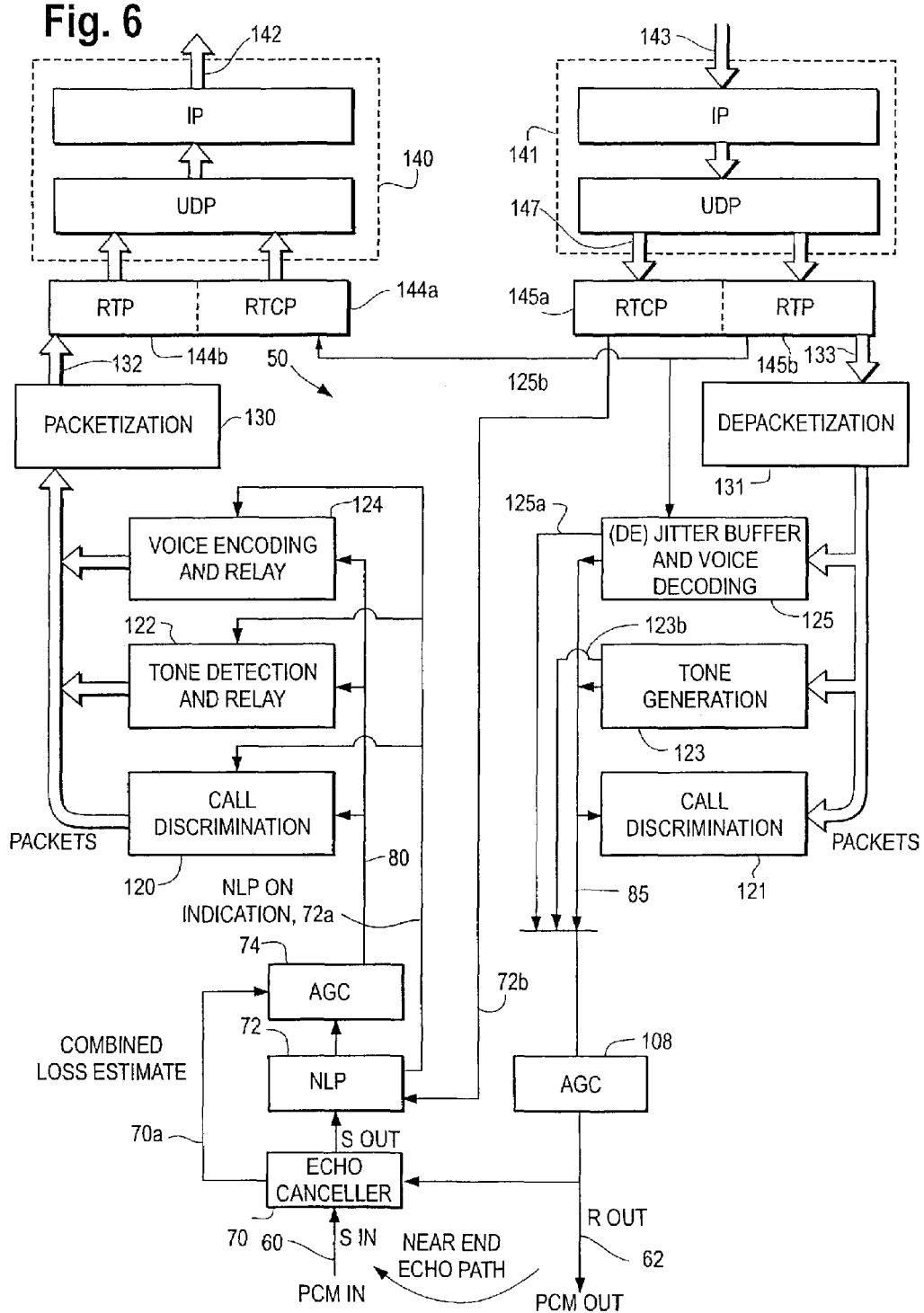
FIG. 6 illustrates an embodiment in accordance with the present invention showing a packet voice transceiver system in which statistics from the transport protocol are used by the jitter buffer management algorithms.

FIG. 6 illustrates an embodiment in accordance with the present invention showing a packet voice transceiver system 50 in which statistics from the transport protocol are used by the jitter buffer management algorithms. In the illustration, additional detail has been shown relating to the protocol mechanism that may be used to transport speech data in a typical VoIP network. As shown in FIG. 6, Internet protocol (IP)-based egress packet stream 143 comprises real-time protocol (RTP) egress packet voice signal 133, and real-time control protocol (RTCP) egress packet stream 147. Egress packet voice signal 133 of FIG. 6 may correspond to, for example, the egress packet voice signal 133 shown in FIG. 2 and FIG. 3. The RTP and RTCP protocols shown in the exemplary embodiment of FIG. 6 may be, for example, protocols such as those described in the Internet Engineering Task Force Request for Comment (RFP) 1889, dated January, 1996, which is incorporated herein by reference in its entirety. In the example of FIG. 6, egress RTCP packets containing control information are separated from egress packet stream 143 by egress transport protocol handler 141 and processed by egress RTCP protocol handler 145(*a*). Egress RTP packets containing speech data are separated from egress packet stream 143 by egress transport protocol handler 141 and egress RTP protocol handler 145(*b*) to form egress packet voice signal 133. Packets contained in egress packet voice signal 133 may then be handled by packet voice transceiver system 50 as described in detail above.

In the embodiment shown in FIG. 6, egress RTP protocol handler 145(b) calculates an estimate of network delay jitter following the receipt of each egress RTP data packet. The delay jitter estimate is normally provided to ingress RTCP protocol handler via delay jitter estimate 125(*b*), for transmission in Sender Report (SR) and Receiver Report (RR) messages contained within ingress RTCP packets. In an embodiment of the present invention, delay jitter estimate 125(*b*) may also be used, for example, by the jitter buffer algorithms of voice decoding system 125, to enable it to more efficiently compensate for unexpected changes in network delay jitter. In such an embodiment, divergence of delay jitter estimate 125(*b*) from the estimates calculated by the jitter buffer algorithms of voice decoding system 125 may signal the need to adjust the operation of the jitter buffer algorithms so that convergence to the new network jitter conditions occurs more rapidly, thereby minimizing the duration and severity of the impact upon voice quality. Although the exemplary embodiment described thus far demonstrates the use of only the delay jitter estimate that is available when using RTCP, the present invention is not limited to the use of only one network statistic. For example, a packet loss statistic may also be used by the jitter buffer algorithms, as it may be a useful indicator of the frequency at which packets of speech data will fail to arrive, requiring that some action be taken to use, for example, earlier received speech data.

In the exemplary embodiment of FIG. 6, echo canceller 70 is used to remove near-end echo of voice signals from ingress PCM signal 60 that may be due to the echo return of outgoing PCM signal 62. Although echo canceller 70 may be designed to efficiently remove near-end echo, it may not be completely effective and some echo may remain. If not remedied, that echo will be transmitted to the far-end party via ingress packet voice signal 142. In the embodiment shown, NLP 72 may be used to provide suppression of any residual echo not cancelled by echo canceller 70. Typically, echo delays of up to approximately 30 milliseconds (ms) are perceived by the listener as sidetone and do not normally create a perception of voice path degradation. When echo delays exceed 30 ms., however, echo becomes increasingly annoying. An embodiment in accordance with the present invention, such as that shown in FIG. 6, may use, for example, RTCP statistics to compute an estimate of the network round-trip delay, which may permit the operation of non-linear processor (NLP) 72 to be optimized according to the delay in the network path. In such an embodiment, round-trip delay estimate 72(*b*) may be calculated from information contained within RTCP control information received by ingress RTCP protocol handler 145 (*a*). Using round-trip delay estimate 72(*b*), NLP 72 may increase the level of suppression as a function of the round-trip delay estimate 72(*b*). In this manner, the additional echo suppression provided by NLP 72 may be applied more aggressively as the chance of the echo being perceived increases, i.e. the more the RTD exceeds approximately 30 ms. This also permits the system to disable NLP 72 when no need exists, avoiding the undesirable clipping effects of NLP 72 when its use is not warranted.

Figure 7:
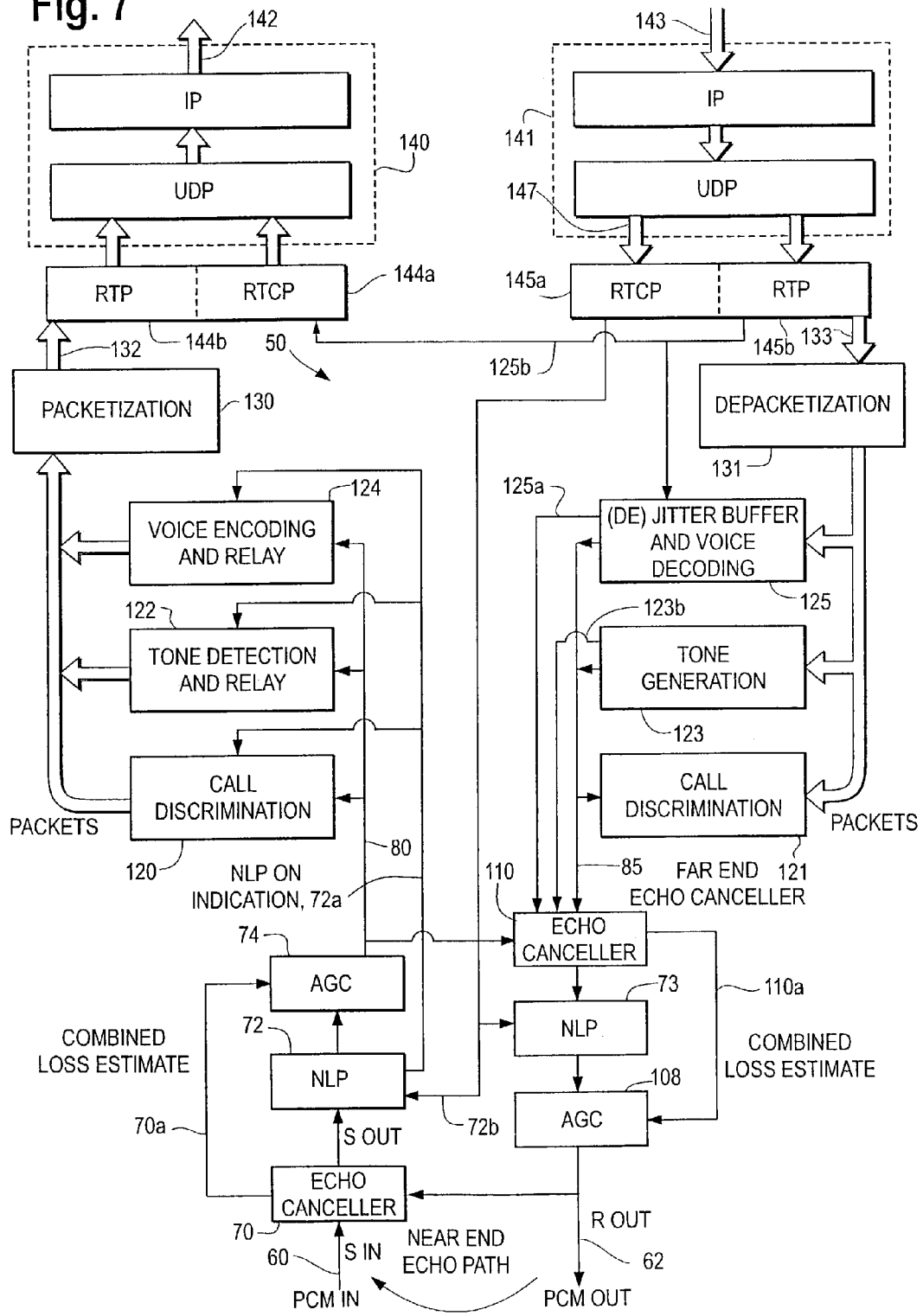
FIG. 7 shows an embodiment which incorporates a far-end echo canceller, in accordance with the present invention.

FIG. 7 shows an embodiment which incorporates a far-end echo canceller, in accordance with the present invention. The far-end echo canceller 110 of FIG. 7 may be, for example, the far-end echo canceller 110 as shown in FIG. 3. As described with respect to FIG. 3, above, some of network gateways 12*a*, 12*b*, and 12*c* of FIG. 1 or 12*a*, 12*b*, 12*c*, and 12*d* of FIG. 1A may not be equipped with near-end echo cancellation functionality, and there may occur a return in egress packet voice signal 143 a portion of the voice signal contained in ingress packet voice signal 142, delayed by the round-trip delay of the packet network. In order to minimize the affect of the echo, the exemplary embodiment of FIG. 7 includes within voice transceiver system 50 far-end echo canceller 110 and non-linear processor (NLP) 73. In addition to the functionality previously described with respect to FIG. 3, an embodiment such as that shown in FIG. 7 may use statistics from the transport protocol to improve, for example, the operation of far-end echo canceller 110 and NLP 73. The algorithms of NLP 73 may be designed to be more or less aggressive in the suppression of residual echo based upon the amount of round-trip delay present in the egress packet voice signal 143, as indicated by round-trip delay estimate 72(*b*). As described previously, when echo occurs less than approximately 30 ms. after the original signal, the echo is normally heard as sidetone, and is not perceived as an impairment. In this case, NLP 73 may be disabled to avoid the undesirable clipping effects of NLP 73 that might otherwise occur. As the echo delay grows, however, echo not cancelled by far-end echo canceller 110 becomes more and more annoying to the user. In such a case, more aggressive suppression may be appropriate. The level of suppression needed may be determined by NLP 73 using round-trip delay estimate 72(*b*).

Although the exemplary embodiment described demonstrates the use of only the network round-trip delay estimate that may be available when using RTCP, the present invention is not limited to the use of only one network statistic. For example, a network delay jitter statistic may also be used by the echo canceller or echo suppressor algorithms, as it may be a useful indicator of the frequency at which packets of speech data will be late. A delay in the arrival of speech packets may require that some action be taken to use, for example, earlier received speech data, which may have effects upon echo canceller or echo suppressor operation. In addition, in an alternate embodiment a round-trip delay estimate may instead be available from, for example, a far-end echo canceller. Depending upon network characteristics, a round-trip delay estimate may also be derived from, for example, the operation of the jitter buffer contained within voice decoding system 125. A round-trip delay estimate from these and other sources may be used in place of round-trip delay estimate 72(*b*) in modifying the behavior of NLP 73, without departing from the spirit of the present invention.

Although the previous discussions of exemplary embodiments of the present invention have only described the use of the delay jitter and round-trip delay statistics in adjusting speech processing algorithms, other network statistics that may be measured during the operation of a communication protocol over a network may be used to improve the operation of speech processing, or for that matter, of the processing of other modes of communication as well, for example, video. Possible examples of such network statistics include, but are not limited to, for example, network latency, network jitter, sender and/or receiver timestamps, cumulative packets lost count, fraction of packets lost, highest sequence number received, and sender report/receiver report generation statistics. Any of these and other network statistics may be used to improve operation of a higher-level application such as, for example, packet telephony and packet video, without departing from the spirit of the present invention.

Figure 8:
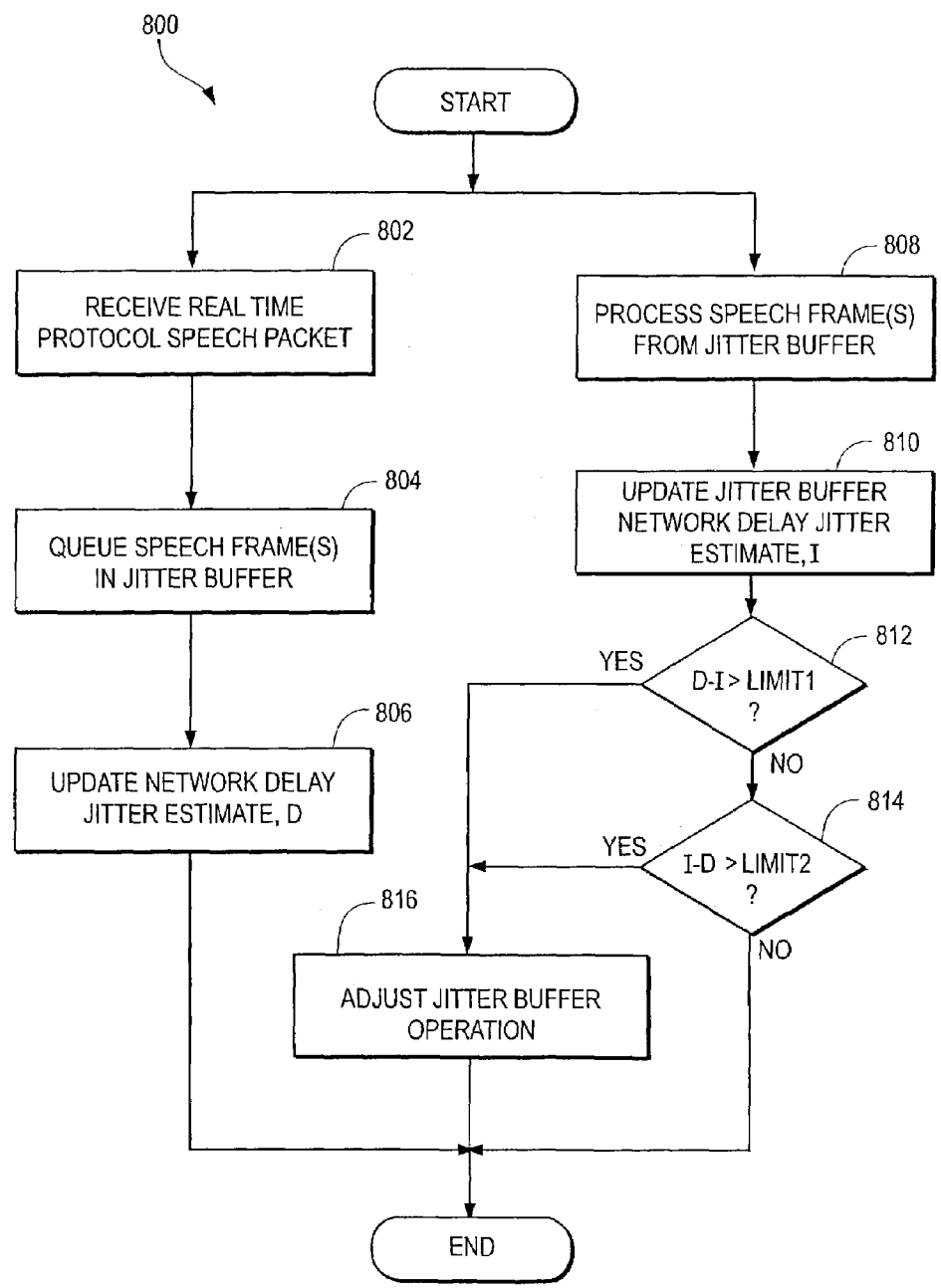
FIG. 8 is a high-level flow diagram illustrating a method of operating an embodiment in accordance with the present invention.

FIG. 8 is a high-level flow diagram illustrating a method of operating an embodiment in accordance with the present invention. In the example shown, two separate activities may be taking place. On the left side of the diagram, the real-time transport protocol is receiving a speech packet (block 802), queuing the speech frames from the packet (block 804), and then updating the network delay jitter estimate using information in the packet header (block 806). The left side of FIG. 8 (blocks 802, 804, and 806) may represent, for example, a portion of the processing that takes place in the protocol handler when receiving RTP packets under the requirements described in Internet Engineering Task Force RFC 1889.

The right side of FIG. 8 may represent those actions that may occur as a part of speech playback in a packet telephony terminal. Such a terminal may process the next frame of speech data (block 808) for replay, update the jitter buffer algorithm estimate of network delay jitter (block 810), and compare the jitter buffer algorithm network delay jitter estimate to the value calculated by the transport protocol handler (blocks 812 and 814) In the exemplary embodiment shown in FIG. 8, operation of the jitter buffer algorithm is adjusted (block 816) whenever the estimate of the network delay jitter calculated by the transport protocol rises above the jitter buffer estimate by more than parameter, Limit1, or if it drops below the jitter buffer estimate by more than parameter, Limit2. In this manner, the jitter buffer algorithms may be made aware of sudden large excursions in network delay jitter, permitting them to adapt to the new network conditions. Although this exemplary embodiment shows a particular sequence of calculation and decisions using a specific set of parameters, the present invention is not limited to the actions or parameters shown in the exemplary embodiment.

Figure 9:
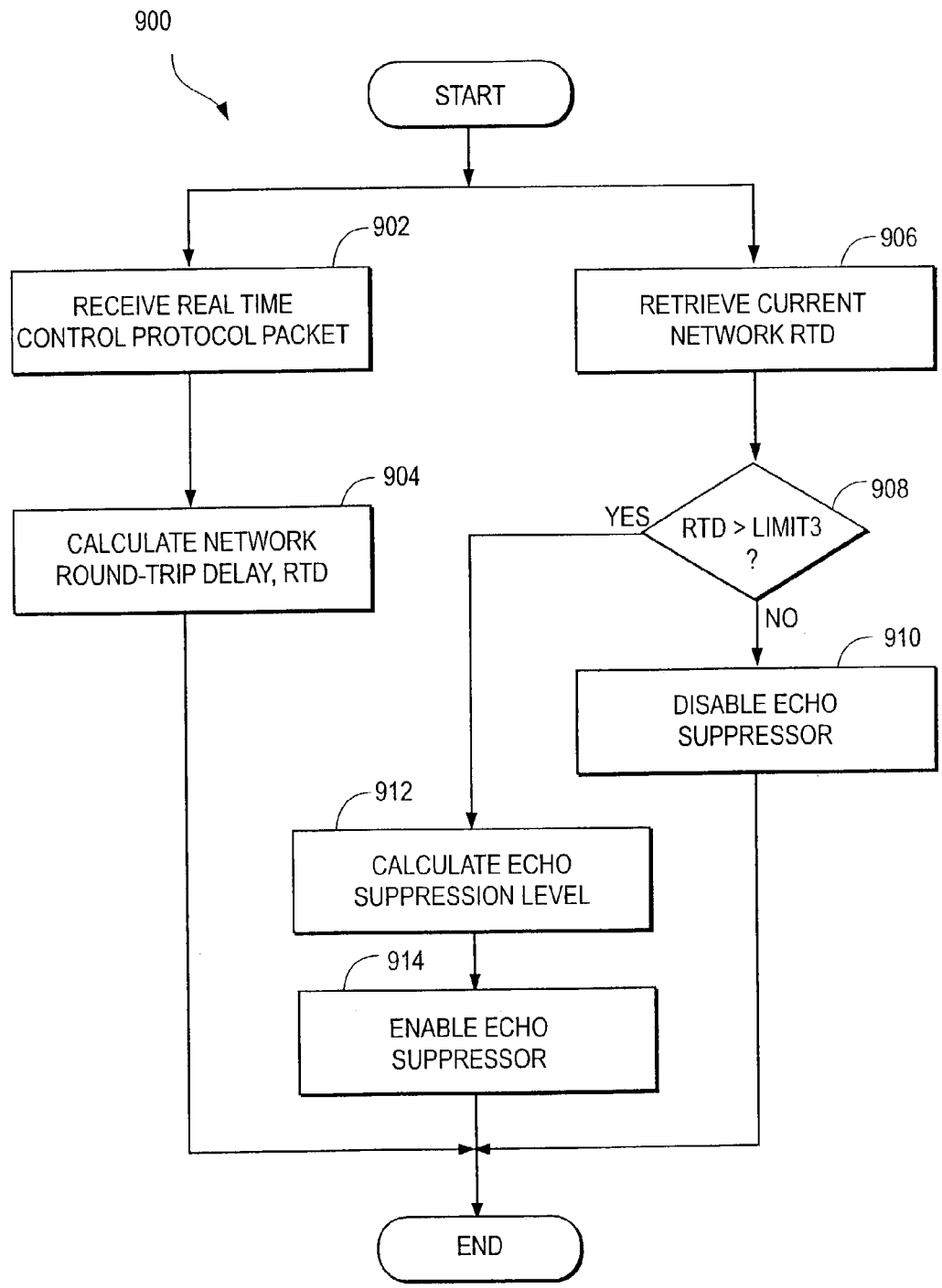
FIG. 9 is a high-level flow diagram illustrating a method of operating another embodiment in accordance with the present invention.

FIG. 9 is a high-level flow diagram illustrating a method of operating another embodiment in accordance with the present invention. In the example shown, two separate activities may be taking place. On the left side of FIG. 9, a terminal may receive a real-time control protocol (RTCP) packet (block 902) such as those described, for example, in Internet Engineering Task Force RFC 1889. Such packets may be transmitted periodically by all of the terminals participating in a call. Parameters within the received RTCP packet may be used to calculate an estimate of the network round trip delay (RTD) (block 904) between the receiver and the sender. On the right side of the diagram, the most recent RTD estimate is compared (block 908) with a predefined delay limit, Limit3, above which it may be desirable to apply echo suppression. If the RTD is above the value of parameter, Limit3, the terminal may calculate an appropriate level of echo suppression. (block 912) and enable the echo suppressor (block 914). If the RTD is below the level of parameter, Limit3, the echo suppressor may be disabled (block 910), in order to avoid the unnecessary and undesirable clipping that may otherwise occur.

Figure 10:
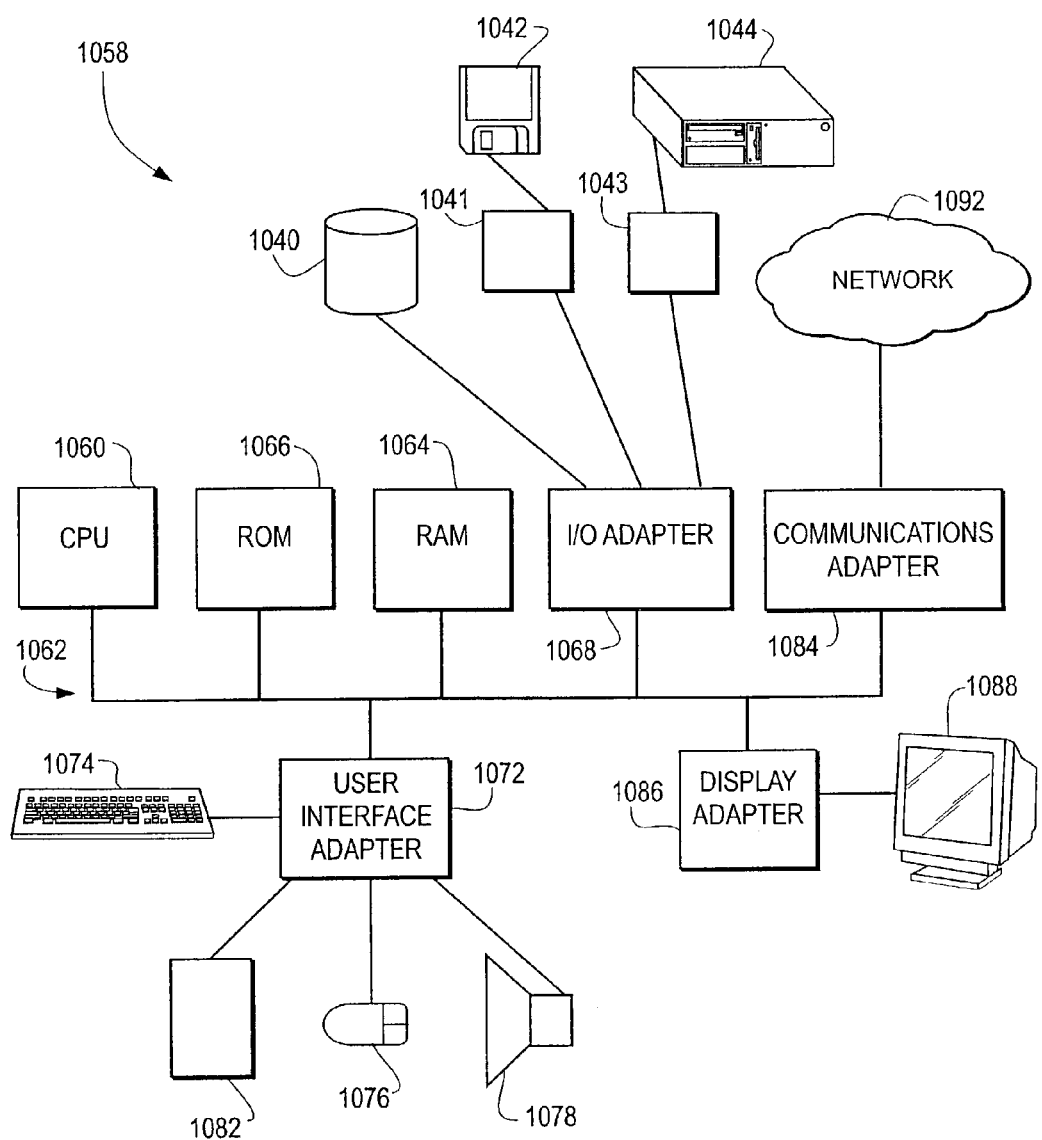
FIG. 10 is a block diagram of an exemplary terminal in which aspects of the present invention may be practiced.

Referring now to FIG. 10, there is illustrated a block diagram of an exemplary terminal 1058, that may correspond, for example, to network gateways 12a, 12b, and 12c of FIG. 1, or 12a, 12b, 12c, and 12d of FIG. 1A, or telephony devices 13a, 13b, 13c, of FIG. 1 or 13a, 13b, 13c, and 13d of FIG. 1A, in which an embodiment in accordance with the present invention may be practiced. A processor 1060 is interconnected via system bus 1062 to random access memory (RAM) 1064, read only memory (ROM) 1066, an input/output adapter 1068, a user interface adapter 1072, a communications adapter 1084, and a display adapter 1086. The input/output adapter 1068 connects peripheral devices such as hard disc drive 1040, floppy disc drives 1041 for reading removable floppy discs 1042, and optical disc drives 1043 for reading removable optical disc 1044. The user interface adapter 1072 connects devices such as a keyboard 1074, a speaker 1078, and microphone 1082 to the bus 1062. The microphone 1082 generates audio signals which are digitized by the user interface adapter 1072. The speaker 1078 receives audio signals which are converted from digital samples to analog signals by the user interface adapter 1072. The display adapter 1086 connects a display 1088 to the bus 1062. Embodiments of the present invention may also be practiced in other types of terminals as well, including but not limited to, a telephone without a hard disk drive 1040, a floppy disk drive 1041, nor optical disk drive 1043, in which case the program instructions may be stored in ROM 1066, or downloaded over communications adapter 1084 and stored in RAM 1064. An embodiment may also be practiced in, for example, a portable hand-held terminal with little or no display capability, in a consumer home entertainment system, or even in a multimedia game system console.

An embodiment of the present invention can be implemented as sets of instructions resident in the RAM 1064 or ROM 1066 of one or more terminals 1058 configured generally as described in FIG. 10. Until required by the terminal 1058, the set of instructions may be stored in another memory readable by the processor 1060, such as hard disc drive 1040, floppy disc 1042, or optical disc 1044. One skilled in the art would appreciate that the physical storage of the sets of instructions physically changes the medium upon which it is stored electrically, magnetically, or chemically so that the medium carries information readable by a processor.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Notwithstanding, the invention and its inventive arrangements disclosed herein may be embodied in other forms without departing from the spirit or essential attributes thereof. Accordingly, reference should be made to the following claims, rather than to the foregoing specification, as indicating the scope of the invention. In this regard, the description above is intended by way of example only and is not intended to limit the present invention in any way, except as set forth in the following claims.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for using communication network statistics in the operation of a real-time communication terminal, the method comprising:
    transferring at least one real-time media stream between a first communication terminal and a second communication terminal using a real-time communication protocol;
    calculating at the first communication terminal a first estimate of a network statistic, the first estimate of the network statistic being a measure of the operation of the real-time communication protocol; and
    adjusting the operation of at least one algorithm used for operating at least one jitter buffer during the playback of the at least one real-time media stream at the first communication terminal or the second communication terminal, when the first estimate of the network statistic diverges, by greater than a certain amount, from a second estimate of the network statistic produced by the at least one algorithm.

2. The method of claim 1 wherein the at least one real-time media stream comprises packetized speech.

3. The method of claim 1 wherein the at least one real-time media stream comprises packetized video.

4. The method of claim 1 wherein the network statistic comprises an estimate of network delay jitter.

5. The method of claim 1 wherein the network statistic comprises an estimate of round trip delay between the first terminal and the second terminal.

6. The method of claim 1 wherein the network statistic comprises the fraction of packets lost.

7. The method of claim 1 wherein the at least one algorithm comprises an algorithm to compensate for network delay jitter.

8. The method of claim 1 wherein the at least one algorithm comprises an algorithm to cancel or suppress echo.

9. The method of claim 8 wherein the network statistic comprises an estimate of round trip delay between the first terminal and the second terminal.

10. The method of claim 9 wherein the algorithm to cancel or suppress echo is less aggressive when the round trip delay is relatively lower and more aggressive when the round trip delay is relatively higher.

11. The method of claim 1 wherein the at least one algorithm comprises an algorithm to compensate for loss of packet data.

12. The method of claim 1 wherein the real-time communication protocol is one of the real time protocols described in the Internet Engineering Task Force Request for Comments 1889.

13. The method of claim 1, wherein the at least one jitter buffer comprises at least two jitter buffers.

14. The one or more circuits of claim 13, wherein the at least one real-time media stream comprises a real-time media stream of speech data and a real-time media stream of video.

15. The method of claim 1, wherein the algorithm for operating the at least one jitter buffer is adjusted whenever the first estimate of the network statistic rises above the second estimate of the network statistic, by more than a first amount, or whenever the first estimate of the network statistic drops below the second estimate of the network statistic, by more than a second amount.

16. A machine-readable storage, having stored thereon a computer program having a plurality of code sections for using communication network statistics in the operation of a real-time communication terminal, the code sections executable by a machine for causing the machine to perform the operations comprising:
    transferring at least one real-time media stream between a first communication terminal and a second communication terminal using a real-time communication protocol;
    calculating at the first communication terminal a first estimate of a network statistic, the first estimate of the network statistic being a measure of the operation of the real-time communication protocol; and
    adjusting the operation of at least one algorithm used for operating at least one jitter buffer during the playback of the at least one real-time media stream at the first communication terminal or the second communication terminal, when the first estimate of the network statistic diverges, by greater than a certain amount, from a second estimate of the network statistic produced by the at least one algorithm.

17. The machine-readable storage of claim 16 wherein the at least one real-time media stream comprises speech data.

18. The machine-readable storage of claim 16 wherein the at least one real-time media stream comprises video.

19. The machine-readable storage of claim 16 wherein the network statistic comprises an estimate of network delay jitter.

20. The machine-readable storage of claim 16 wherein the network statistic comprises an estimate of round trip delay between the first terminal and the second terminal.

21. The machine-readable storage of claim 16 wherein the network statistic comprises the fraction of packets lost.

22. The machine-readable storage of claim 16 wherein the at least one algorithm comprises an algorithm to compensate for network delay jitter.

23. The machine-readable storage of claim 16 wherein the at least one algorithm comprises an algorithm to cancel or suppress echo.

24. The machine-readable storage of claim 23 wherein the network statistic comprises an estimate of round trip delay between the first terminal and the second terminal.

25. The machine-readable storage of claim 24 wherein the algorithm to cancel or suppress echo is less aggressive when the round trip delay is relatively lower and more aggressive when the round trip delay is relatively higher.

26. The machine-readable storage of claim 16 wherein the at least one algorithm comprises an algorithm to compensate for loss of packet data.

27. The machine-readable storage of claim 16 wherein the real-time communication protocol is one of the real time protocols described in the Internet Engineering Task Force Request for Comments 1889.

28. The machine-readable storage of claim 16, wherein the at least one jitter buffer comprises at least two jitter buffers.

29. The machine-readable storage of claim 28, wherein the at least one real-time media stream comprises a real-time media stream of speech data and a real-time media stream of video.

30. The machine-readable storage of claim 16, wherein the algorithm for operating the at least one jitter buffer is adjusted whenever the first estimate of the network statistic rises above the second estimate of the network statistic, by more than a first amount, or whenever the first estimate of the network statistic drops below the second estimate of the network statistic, by more than a second amount.

31. One or more circuits for a real-time communication terminal, the one or more circuits comprising:
  at least one processor operably coupled to a communication network, the at least one processor operable to, at least:
  transfer at least one real-time media stream between a first communication terminal and a second communication terminal using a real-time communication protocol;
  calculate at the first communication terminal a first estimate of a network statistic, the first estimate of the network statistic being a measure of the operation of the real-time communication protocol; and
  adjust the operation of at least one algorithm used for operating at least one jitter buffer during the playback of the at least one real-time media stream at the first communication terminal or the second communication terminal, when the first estimate of the network statistic diverges, by greater than a certain amount, from a second estimate of the network statistic produced by the at least one algorithm.

32. The one or more circuits of claim 31 wherein the at least one real-time media stream comprises packetized speech.

33. The one or more circuits of claim 31 wherein the at least one real-time media stream comprises packetized video.

34. The one or more circuits of claim 31 wherein the network statistic comprises an estimate of network delay jitter.

35. The one or more circuits of claim 31 wherein the network statistic comprises an estimate of round trip delay between the first terminal and the second terminal.

36. The one or more circuits of claim 31 wherein the network statistic comprises the fraction of packets lost.

37. The one or more circuits of claim 31 wherein the at least one algorithm comprises an algorithm to compensate for network delay jitter.

38. The one or more circuits of claim 31 wherein the at least one algorithm comprises an algorithm to cancel or suppress echo.

39. The one or more circuits of claim 38 wherein the network statistic comprises an estimate of round trip delay between the first terminal and the second terminal.

40. The one or more circuits of claim 39 wherein the algorithm to cancel or suppress echo is less aggressive when the round trip delay is relatively lower and more aggressive when the round trip delay is relatively higher.

41. The one or more circuits of claim 31 wherein the at least one algorithm comprises an algorithm to compensate for loss of packet data.

42. The one or more circuits of claim 31 wherein the real-time communication protocol is one of the real time protocols described in the Internet Engineering Task Force Request for Comments 1889.

43. The one or more circuits of claim 31, wherein the at least one jitter buffer comprises at least two jitter buffers.

44. The one or more circuits of claim 43, wherein the at least one real-time media stream comprises a real-time media stream of speech data and a real-time media stream of video.

45. The one or more circuits of claim 31, wherein the algorithm for operating the at least one jitter buffer is adjusted whenever the first estimate of the network statistic rises above the second estimate of the network statistic, by more than a first amount, or whenever the first estimate of the network statistic drops below the second estimate of the network statistic, by more than a second amount.

* * * * *